Figure 1:
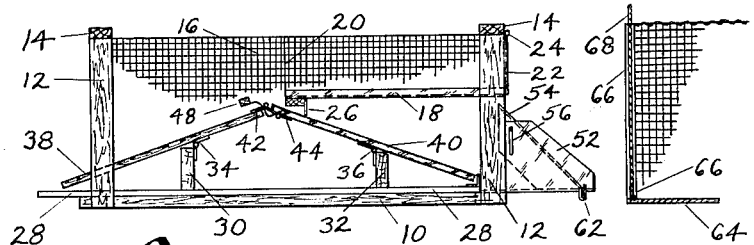

Oct. 14, 1952      F. B. HEIBEL      2,613,473
ANIMAL TRAP

Filed Feb. 20, 1948      2 SHEETS—SHEET 1

INVENTOR
Frank B. Heibel
BY
Rey Eilers
ATTORNEY

Oct. 14, 1952          F. B. HEIBEL          2,613,473
ANIMAL TRAP
Filed Feb. 20, 1948          2 SHEETS—SHEET 2
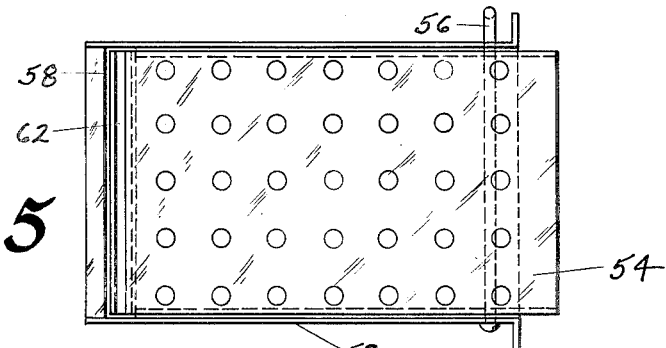
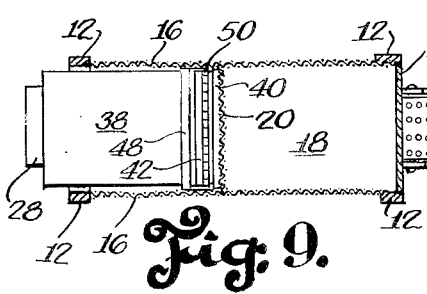
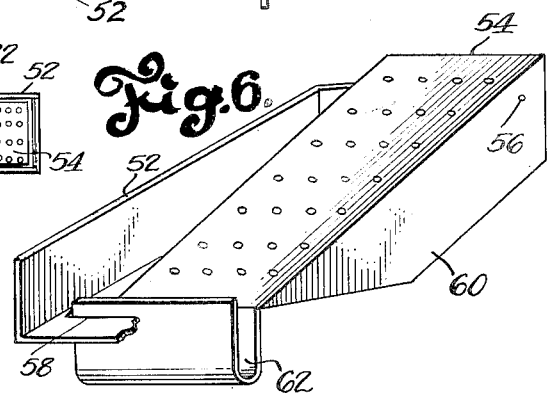
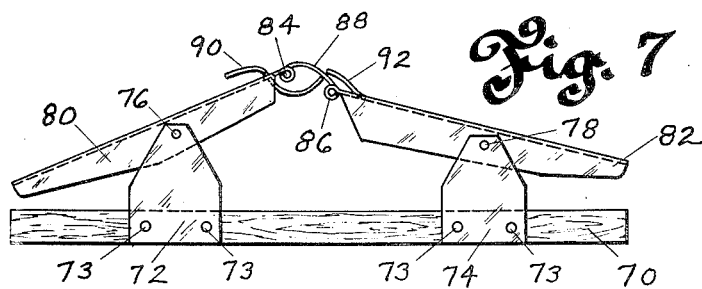
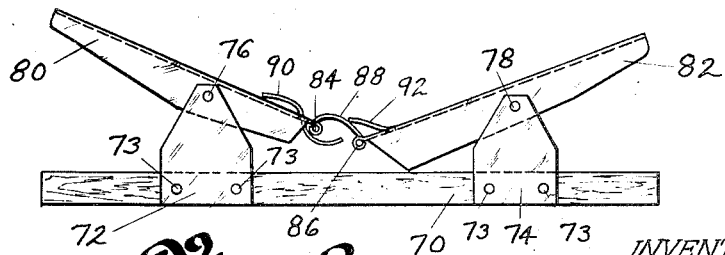
INVENTOR
Frank B. Heibel
BY
Roy Eilers
ATTORNEY Patented Oct. 14, 1952

2,613,473

UNITED STATES PATENT OFFICE 2,613,473

ANIMAL TRAP

Frank B. Heibel, St. Louis, Mo.

Application February 20, 1948, Serial No. 9,700

18 Claims. (Cl. 43—76)

This invention relates to improvements in animal traps. More particularly, this invention relates to improvements in animal traps which can capture a number of animals without requiring manual re-setting.

It is therefore an object of the present invention to provide an improved animal trap which can capture a number of animals without requiring manual re-setting.

Most animal traps are of two general types: one type of trap having trigger-held jaws or strikers that can be tripped to kill the animal or hold a part of the animal's anatomy and thus prevent the animal's escape; the other type of trap having a movable portion that permits the animal to enter the trap and then prevents the animal's escape. The first type of trap will usually hold the animal tightly until the trapper releases the trap, but the trap must be manually re-set and cannot catch more than one animal per setting. The second type of trap holds the trapped animals in close confinement, and it can capture a number of animals without requiring manual re-setting. The desirability of the second type of trap is obvious since it can capture a number of animals without requiring manual re-setting. Many traps of this second type have been proposed, but none of them has been really satisfactory. Some of the traps require the animal to press forward and raise a door that is intended to swing down behind the animal and prevent its escape; but it has been found that many of the animals will not press against the door and enter the trap. Other of the traps have yieldable floors which give way under the weight of the animal and drop it into a receptacle before swinging back to their original position; but it has been found that many animals are too wary to venture onto the floors of such traps. Consequently, while these prior traps occasionally capture a careless animal or two, those traps are incapable of capturing many shrewd and clever animals. For these reasons, prior animal traps are objectional. The present invention obviates these objections by providing an improved animal trap which has a ramp or floor that is solidly locked in position until the animal has moved inwardly from the opening of the trap, and then quickly moves to bar the animal's escape. The apparent solidity of the ramp or floor deceives the most wary of animals; and when the ramp or floor moves, the animal cannot gain the opening of the trap before escape is barred. It is therefore an object of the present invention to provide an animal trap with a ramp or floor that is solidly held in position until the animal has moved inwardly from the opening of the trap, and that thereafter quickly moves to bar the animal's escape.

By having a ramp or floor that moves to bar the animal's escape, the trap of the present invention is enabled to provide a large opening for the trap. Many animals are wary enough to regard traps, which have confined openings, with great suspicion; and in many cases those animals will not pass through those openings. Few, if any, animals would hesitate to enter the large opening of the trap provided by the present invention; and once inside the opening, the animal is reassured by the seeming solidity of the ramp or floor. As the animal moves further inwardly, in quest of the bait, it strikes a trigger that permits the ramp or floor to move and block the animal's escape. Thereafter the animal can move about on the ramp or floor; but such movement will not return the ramp or floor to its original position and permit the animal to escape. Movement of the ramp or floor to its original position can only be effected by application of the animal's weight on a second ramp or floor; and such movement does not aid the animal since it is accompanied by a movement of the second ramp or floor that prevents escape of the animal. The animal will be able to move about on the second ramp or floor but will be unable to cause further movement of that ramp or floor. Instead, the animal can only pass through a swinging door to a collecting cage. While animals normally refuse to press against and pass through a swinging door, animals that are already trapped will do so from sheer desperation. In moving, the second ramp or floor not only blocked the escape of the animal but it restored the first ramp or floor to its initial position, thus automatically re-setting the trap. The trap thus invites the animal, traps it by blocking its escape with the first ramp or floor, forces it to move onto the second ramp or floor, thus forcing the animal to re-set the trap and again lock itself against escape, and finally leaves the animal no alternative but to pass into a collecting cage. In this simple but effective way, the animal is forced to move progressively toward the collecting cage and to re-set the trap as it does so. It is therefore an object of the present invention to provide a trap which forces the animal to move progressively toward a collecting cage and to reset the trap as it does so.

The present invention attains this desirable result by rotatably supporting two ramps or floors within the trap, and by connecting the adjacent ends of those ramps or floors with a toggle. The toggle is pre-set to prevent movement of the ramps or floors, irrespective of the weight of an animal, until the animal trips a trigger. Thereafter the toggle permits quick movement of both ramps or floors, and it sets itself so the weight of the animal on the first ramp cannot move the ramps or floors. The toggle will only permit movement when the animal moves beyond the pivot for the second ramp or floor; and such movement effectively blocks the animal's escape and re-sets the ramps and toggle to their original position. The toggle not only provides the desired movement of the ramps or floors, but it provides a feeling of solidity for those ramps or floors. It is therefore an object of the present invention to provide a toggle that connects the pivoted ramps or floors of an animal trap.

Animals are often very suspicious of traps wherein imperforate barriers are presented to them. With the present invention, such barriers are obviated since the animal can look in through the open end of the trap and see the bait; and, when trapped by movement of the ramps or floors, the animal can see through perforations in the door of the collecting cage. It is therefore an object of the present invention to provide an animal trap wherein the animal can always see ahead.

Many animals are very suspicious of traps formed of metal, and yet metal is often needed to keep the animals from gnawing their way to freedom. The present invention provides sufficient metal in the trap to keep the animals safely confined and yet avoids such a use of metal as would deter any animals. The present invention does so by providing a non-metallic ramp or floor at the entrance of the trap, but provides a metallic second ramp or floor. The non-metallic ramp or floor will block escape of the animal through the opening by which it entered the trap; and while the animal could gnaw through that ramp, it will not be sufficiently desperate to do so until it has searched all parts of the trap for an opening. That search will cause the animal to trip the toggle and place the metallic ramp or floor between the animal and the opening at the entrance of the trap. With this arrangement, when the animal could gnaw its way out of the trap it is not desperate enough to do so, and when it is desperate enough to attempt to gnaw its way out it cannot do so. It is therefore an object of the present invention to provide a non-metallic ramp or floor at the entrance of the trap and a metallic ramp or floor at the inner end of the trap.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purposes of illustration only and do not limit the invention and that the invention will be defined by the appended claims.

In the drawing

Figure 2:
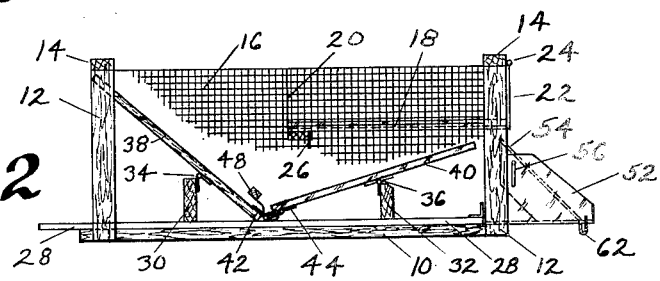
Figure 3:
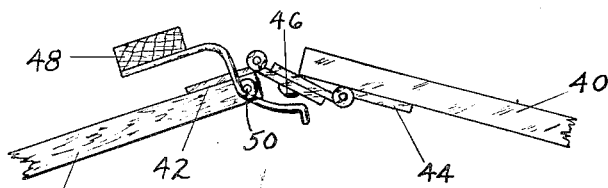
Figure 4:
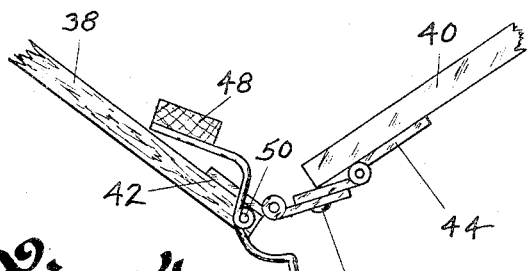

Fig. 1 is a partially broken-away side elevational view of an animal trap and a cross sectional view of a portion of a collecting cage used with that trap, Fig. 2 is a partially broken-away side elevational view of the animal trap of Fig. 1, and it shows the ramps or floors of that trap in tripped position, Fig. 3 is an enlarged side elevational view of the inner ends of the ramps or floors of the trap of Figs. 1 and 2, and it shows those ramps in their initial position, Fig. 4 is an enlarged side elevational view of the inner ends of the ramps or floors of the trap of Figs. 1 and 2, and it shows those ramps in tripped position, Fig. 5 is an enlarged plan view of the exit and door for the trap of Figs. 1 and 2, and it shows that exit and door as they have been rotated 180° about a vertical axis, Fig. 6 is an enlarged perspective view, partially broken away, of the exit and door of Fig. 5, Fig. 7 is a side elevational view of a modified form of ramp construction that is usable in the trap of Figs. 1 and 2, Fig. 8 is a side elevational view of the ramp construction of Fig. 7, and it shows those ramps in tripped position, and Fig. 9 is a sectional plan view of the trap of Figs. 1 and 2.

Referring to the drawing in detail, the numeral 10 denotes the base of an animal trap. This base may be made of any suitable material, but it is shown in the drawing as being made of wood. Four upright supports, two of which are shown in the drawing and two of which are behind those shown in the drawing, are secured to the opposite ends of the base 10; and those upright supports are denoted by the numeral 12. Two horizontal supports 14 span the upper ends of the upright supports 12 at the ends of base 10; and the supports 14 cooperate with the supports 12 to form a sturdy frame for the trap. This frame supports netting 16 on the top, sides, and right hand end of the trap; the left hand end of the trap normally being open. The netting 16 has openings which are small enough to keep animals from escaping through them. The netting 16 is preferably quite stiff and heavy, because such netting cannot be spread or broken by the animals and because such netting helps to stiffen the frame of the trap.

A bait tray 18 is positioned within the trap, and that tray spans the width of the trap. The tray is supported at its right hand end by attachment to the upright supports 12; and the left hand end of the bait tray 18 is supported, as by being secured to netting 20 that is vertically disposed and is secured to the netting 16. The bait tray 18 preferably has an imperforate bottom so animals confined beneath the bait tray cannot reach the bait and consume it. The netting 20, which cooperates with the netting 16 and bait tray 18 to form a bait compartment, is pervious but it does not expose the bait to the animals since the openings in that netting are close together. However, the openings in netting 20 are large enough to permit the animals to view the bait as they stand adjacent the left hand end of the trap.

An opening, not shown, is provided in the upper part of the netting 16 at the right hand end of the trap, and that opening communicates with the bait compartment. A door 22 normally closes that opening, and that door is hinged to one of the horizontal supports 14 of the frame by a hinge 24. When bait is to be placed in the bait compartment, the door 22 is opened and bait is placed on the tray 18. Thereafter the door 22 is closed, either by gravity or by manual operation; and when closed, the door 22 serves to keep animals from entering the bait compartment. A plate 26 depends downwardly from the bottom of the bait tray 18, and that plate is coextensive with the front edge of the tray and spans the interior of the trap.

The numeral 28 denotes a support which can be inserted in or removed from the normally open left hand end of the trap. Support 28 carries pivot blocks 30 and 32 which are spaced apart, and are located along the length of support 28. The pivot block 30 carries a hinge 34, and the pivot block 32 carries a hinge 36. A ramp or floor 38 is secured to and supported by the hinge 34, and that ramp is capable of rotating relative to the pivot block 30. A ramp or floor 40 is secured to and supported by the hinge 36, and that ramp is capable of rotating relative to the pivot block 32. The ramps 38 and 40 span the interior of the trap and serve to confine animals, entering the trap, to the areas above the ramps.

The right hand end of ramp 38 carries a hinge 42 on the upper surface thereof, and the left hand end of the ramp 40 carries a hinge 44 on the under surface thereof. The hinge 42 is of usual form and construction, but the hinge 44 is a slightly modified version of the usual and customary type of hinge. Instead of having both of the plates thereof tangent to the same side of the hinge pin, hinge 44 has one plate tangent to one side of that pin and has the other plate tangent to the other side of that pin. This permits the left hand plate of hinge 44 to rotate more than one hundred and eighty (180) degrees relative to the ramp 40.

The outer plates of hinges 42 and 44 are secured to ramps 38 and 40 respectively, and the inner or adjacent plates of those hinges are directly secured together, as by rivets 46, to form a connecting link between the pins of hinges 42 and 44. The hinges 42 and 44 cooperate with ramps 38 and 40, and hinges 34 and 36 to form a double toggle arrangement. When ramps 38 and 40 are in their initial position, as shown in Figs. 1 and 3, the pin of hinge 44 is below a straight line between the pins of hinges 42 and 36; and the pin of hinge 42 is above a straight line between the pins of hinges 44 and 34. In that position, the left hand end of ramp 40 overlies and rests upon the riveted plates of hinges 42 and 44, thus normally preventing downward movement of the adjacent ends of ramps 38 and 40. Such downward movement can only be attained by rotating the riveted plates of hinges 42 and 44 until the pin of hinge 44 is above the straight line between the pins of hinges 42 and 36 or until the pin of hinge 42 is below a straight line between the pins of hinges 44 and 34. Thereupon the toggle arrangement will permit the ramps 38 and 40 to move to tripped position, as shown in Figs. 2 and 4. In that position, the left hand end of ramp 40 will again overlie and rest on the riveted plates of hinges 42 and 44 and the pin of hinge 44 will again be positioned below a straight line between the pins of hinges 42 and 36; but this time the pin of hinge 42 will be below a straight line between the pins of hinges 44 and 34. It will be noted that in the initial or re-set position of Figs. 1 and 3 or in the tripped position of Figs. 2 and 4, the pin of hinge 42 is so located relative to the pin of hinge 44 and the left hand end of ramp 40 that any pressure which is exerted on the pin of hinge 42 in a direction tending to move that pin through a straight line between the pins of hinges 34 and 36 will force the riveted plates of hinges 42 and 44 into tighter engagement with the left hand end of ramp 40; thus locking the ramps against movement. As a result, the weight of an animal cannot be applied to ramp 38 and cause movement of ramps 38 and 40. Thus, ramp 38 can provide a sense of solidity for animals, and yet can move quickly to the position of Figs. 2 and 4 when the riveted plates of hinges 42 and 44 are rotated in a counter-clockwise direction. Moreover, the ramp 38 can remain fixed in the position of Fig. 2 despite the weight of an animal upon that ramp, and yet can quickly return to the position of Figs. 1 and 3 when the riveted plates of hinges 42 and 44 are rotated in a counter-clockwise direction.

The counter-clockwise rotation of those riveted plates is provided in the position of Figs. 1 and 3 by a trigger 48 which is pivoted to the right hand end of ramp 38. The left hand end of the trigger 48 is in the form of a treadle and it extends above the right hand end of ramp 38. The right hand end of trigger 48 underlies the riveted plates of hinges 42 and 44 and is adjacent the pin of hinge 44. When a downward force is exerted by an animal on the treadle of the trigger 48, that trigger will rotate about pivot 50 on ramp 38 and cause counter-clockwise rotation of the riveted plates of hinges 42 and 44. In the position of Figs. 2 and 4, counter-clockwise rotation of the riveted plates of hinges 42 and 44 is caused by clockwise rotation of ramp 40, since such rotation will raise the pin of hinge 44. The clockwise rotation of ramp 40 can be caused by the weight of an animal when that animal moves to the right hand end of ramp 40. Thus, shifting of the ramps 38 and 40 from the position of Figs. 1 and 3 to the position of Figs. 2 and 4, and vice versa, is caused by an animal entering the trap.

An opening, not shown, is provided in the lower part of the netting 16 at the right hand end of the trap, and that opening is adjacent the right hand end of ramp 40. This opening is provided with an exit 52 of U-shape, and one end of the exit 52 extends inwardly through the opening and is secured to the upright supports 12 at the right hand end of the trap. The other end of the exit 52 extends outwardly from the opening in the trap and extends into an opening in the left hand end of collecting cage 64. While the cage 64 is shown in Fig. 1 as being spaced from the trap, that cage will normally press against the right hand end of the trap; and the opening in the cage 64 will telescope over the right hand end of exit 52. A pivot 56, in the form of a rod that has an enlarged head and has a shank that spans the exit 52 and is then bent downwardly, is supported by the U-shaped exit 52. A perforated door 54 is rotatably mounted on the pivot 56, and that door spans the distance between the spaced side walls of the U-shaped exit 52. A slot 58 is provided in the bottom wall of the U-shaped exit 52, and that slot receives the folded bottom 62 of the door 54. The door 54 is provided with vertically disposed folded sides 60 that extend downwardly adjacent the side walls of the U-shaped exit 52. The folded sides 60 and folded bottom 62 of the perforated door 54 are of considerable benefit because animals which pass by the perforated door 54 into the collecting cage 64 may try to raise that door and pass back into the trap. The folded sides 60 and the folded bottom 62 of the door 54 will cooperate with the side walls and slot of the U-shaped exit 52 to keep the animals from reaching behind the door and grasping its edge preparatory to opening that door. Thus door 54 is a one-way door.

The collecting cage 64 is preferably made with a frame and with netting supported by that frame, and the only opening in the cage is in register with the U-shaped exit 52 of the trap. The opening in the collecting cage 64 is bounded on each side by vertical guides 66, which guides act to support and guide a door 68. The door 68 is normally in raised position so the opening in the collecting cage 64 can be telescoped over the U-shaped exit 52 of the trap, and so the left hand edge of the collecting cage 64 can be pressed against and can hold the door 22 of the bait compartment closed. With such an arrangement the animals cannot open the door 22 and get into the bait compartment; and once the animals have entered the trap, tripped the ramps, re-set the ramps, and passed beyond the door 54, they will be held within the collecting cage 64.

When it is time to separate the collecting cage 64 from the trap, as in disposing of the animals confined in cage 64, the door 68 will be pressed downwardly as the collecting cage 64 is gradually moved away from the trap. Thus, as the opening in the collecting cage 64 moves toward the right hand end of the U-shaped exit 52, the door 68 will be progressively closed until it is completely closed, as shown in Fig. 1. When in this position, the door 68 will prevent the escape of animals from the collecting cage 64.

If desired, a number of collecting cages may be provided for each trap; and where that is done, a fresh cage can be secured to the trap as soon as a filled cage is removed. This avoids periods of non-use consequent upon the need of removing the cage to dispose of the animals confined therein. In assemblying a fresh cage, or the emptied cage, with the trap it is only necessary to raise the door 68 of the cage and telescope the opening of the cage over the U-shaped exit 52 of the trap.

It will be noted that in Fig. 1 the left hand end of ram 38 is so close to the support 28 that an animal cannot force its way between that ramp and the support. Moreover, it will be noted that an animal that is adjacent the left hand end of the trap can look directly up the ramp 38 into the bait compartment. No barrier apparently exists to the free ingress and egress of the animal; and when touched, the ramp 38 gives a feeling of solidity. The animal may then enter the trap and cautiously move upwardly along the ramp 38. During the time the animal is on that portion of the ramp to the left of pivot block 30, the weight of the animal will tend to rotate the ramp in a counter-clockwise direction; but that tendency will be positively resisted by the direct linkage between ramp 38, hinge 42, hinge 44, ramp 40, and pivot block 32. During the time the animal is on that portion of the ramp to the right of pivot block 30, the weight of the animal will tend to rotate the ramp 38 in a clockwise direction; but that tendency will be positively resisted by the engagement between the riveted plates of hinges 42 and 44 and the left hand end of ramp 40. Thus, until the animal trips the trigger 48, the ramp 38 is solidly held against any and all rotation.

As the animal moves upwardly along the ramp 38 toward the bait compartment it will strike the trigger 48. The treadle of that trigger is positioned adjacent the netting 20 of the bait compartment so some part of the animal's anatomy will touch and press downwardly on that treadle. Such pressure will cause the trigger 48 to rotate in a counter-clockwise direction and thereby cause counter-clockwise rotation of the riveted plates of hinges 42 and 44. The rotation of the riveted plates of hinges 42 and 44 will disable the toggle arrangement and permit the weight of the animal to rotate the ramp 38 in a clockwise direction to the position shown in Figs. 2 and 4. As the ramp 38 begins to rotate, the animal may cling to that ramp or it may try to retrace its steps and gain the opening at the left hand end of the trap. If the animal attempts to cling to the ramp 38, that ramp will carry the animal to the bottom of the trap; and if the animal attempts to leap back toward the left hand end of ramp 38, the force exerted by the animal in making the leap will merely speed the rate of rotation of the ramp 38. The ramp 38 and the pivot block 30 are so dimensioned and positioned that the left hand end of the ramp 38 can move adjacent the left hand horizontal support 14 of the trap, thus preventing escape of the animal that tripped the trigger 48. Consequently, whether the animal clings to ramp 38 or attempts to retrace its steps, prompt rotation of the ramp 38 to the position of Figs. 2 and 4 will effectively block the animal's escape. At the time the ramp 38 moved, the ramp 40, to which it is connected by the hinges 42 and 44, also moved. The two ramps 38 and 40 thus assume the position shown in Figs. 2 and 4; and in that position they block the inlet and outlet openings of the trap.

Once the inlet opening at the left hand end of the trap has been obstructed, by clockwise rotation of ramp 38, the animal within the trap will search for an opening through which it can escape. In its searching, the animal may move about on the ramp 38, but the animal's weight cannot cause movement of ramps 38 or ramp 40 because the toggle arrangement has again locked itself. When the animal is on that portion of ramp 38 to the right of pivot block 30, the weight of the animal will tend to hold the ramps 38 and 40 against movement; and when the animal is on that portion of ramp 38 to the left of pivot block 30, the weight of that animal will be unable to cause rotation of ramps 38 and 40 since that weight will act to jam the riveted plates of hinges 42 and 44 against the left hand end of ramp 40. When the animal strikes the trigger 48, that trigger will be unable to rotate the riveted plates of hinges 42 and 44; because the treadle 48 will strike ramp 38 and be held before the right hand end of trigger 48 can engage the riveted plates. Thus, no matter where the animal moves on ramp 38, its weight cannot cause rotation of the ramps 38 and 40.

Being unable to locate an opening adjacent ramp 38, the animal will start to move up ramp 40. While the animal is on that portion of ramp 40 to the left of pivot block 32, the animal's weight will hold the ramps 38 and 40 against rotation. However, when the animal is on that portion of the ramp 40 to the right of pivot block 32, the animal's weight will cause ramp 40 to begin to rotate in a clockwise direction. That rotation will rotate the riveted plates of hinges 42 and 44 in a counterclockwise direction, thus disabling the toggle arrangement. Thereupon, the weight of the animal will cause quick rotation of the ramps 38 and 40 to the position of Figs. 1 and 3. This rotation re-sets the trap and confines the animal between bait tray 18, plate 26, ramp 40, and perforated door 54. The animal will be unable to stop the rotation of ramps 40 and 38, once that rotation has started; since clinging to ramp 40 will not stop that rotation, and exerting force on ramp 40, as in trying to leap toward the left hand end of the trap, will merely speed the rotation of ramps 40 and 38.

Once the ramps 38 and 40 have been restored to the position of Figs. 1 and 3, the animal cannot cause further rotation of those ramps. When the animal is on that portion of ramp 40 to the right of pivot block 32, the animal's weight resists rotation of the ramps; and when the animal is on the portion of ramp 40 to the left of pivot block 32, the animal's weight will merely press the left hand end of ramp 40 into tighter engagement with the riveted plates of hinges 42 and 44. Consequently, movement of the animal on ramp 40 will not free it; and eventually the animal will press against the perforated door 54, raise that door, and pass by the door into the collecting cage 64. Once the animal has passed by the door 54, that door will drop back into the position shown in the drawing; and the animal will be confined within collecting cage 64.

The ramps 38 and 40, which were re-set by the animal's weight, are in position to capture further animals. Thus, the trap entices animals, confines them between the ramps 38 and 40, forces them to re-set the ramps 38 and 40, and finally drives them to pass through door 54 and lock themselves in the collecting cage 64. Traps, built in accordance with the principles and teachings of the present invention have caught as many as sixteen animals per trap in a twelve hour period.

The pivot blocks 30 and 32 and the ramps 38 and 40 are so dimensioned and proportioned that the left hand end of ramp 38 can move a greater distance than the right hand end of ramp 40 moves. Thus the ramp 38 can clear and then obstruct the large inlet opening at the left hand end of the trap, while the ramp 40 is clearing and then obstructing the small exit opening at the right hand end of the trap. Moreover, the ramps 38 and 40 are balanced and weighted so the animal's weight is sufficient to move the ramps 38 and 40 from the position of Figs. 1 and 3 to the position of Figs. 2 and 4 and vice versa.

Animals are often reluctant to tread upon metal surfaces, and yet such surfaces are often necessary to foil an animal's effort to gnaw its way out of a trap. Many prior traps have freely employed metal; and while those traps are escape-proof, those traps are largely unsuccessful in enticing the animals. The trap of Figs. 1–6 provides sure and certain confinement for the animals and yet does not repel them by confronting those animals with a display of metal; and it does so by making the ramp 38 of, or covering it with, wood or other non-metallic material, and by making ramp 40, bait tray 18, plate 26, netting 16, door 54, and collecting cage 64 of metal. The non-metallic material of, or on, ramp 38 encourages the animal to tread upon it and move toward the bait compartment; and while the animal might gnaw its way through ramp 38, if that ramp was made wholly of wood, the animal will not do so until it has explored all parts of the interior of the trap for possible avenues of escape. That exploration takes the animal onto the right hand portion of ramp 40 and causes rotation of that ramp, with consequent confinement of the animal between bait tray 18, plate 26, ramp 40, netting 16, and door 54. At this point the animal may well be desperate enough to seek to gnaw its way out, but the animal is completely surrounded by metal and gnawing is futile. Similarly, when the animal presses door 54 upwardly and passes into collecting cage 64, gnawing is futile since the animal is again surrounded by metal.

Figs. 7 and 8 show a modified form of ramp construction for the trap of Figs. 1–6. This ramp construction is particularly well suited for large scale production methods. The two ramps can be stamped from sheet metal, as can the supports for the pivots of those ramps. If desired, the left hand ramp can be provided with a non-metallic cover or coating, as for example, linoleum, cloth, wood, paper or the like; but where the animals to be caught are not shrewd, such a cover or coating is not necessary. Animals that are shrewd, as for example rats, will often refuse to mount ramps of bare metal; and where the traps of Figs. 1–8 are to be used to capture rats, the left hand ramps should be of, or coated with, a non-metallic material. However, where the animals to be caught are not very shrewd, as for example mice, the left hand ramps can be of bare metal.

The ramp construction of Figs. 7 and 8 includes a base 70 which carries spaced pivot supports 72 and 74 on the opposite sides thereof. The pivot supports 72 and 74 are secured to the base 70 by nails or pins or screws 73. The spaced pivot supports 72 and 74 are spanned by pivots 76 and 78 respectively. Pivot 76 supports a ramp 80, and pivot 78 supports a ramp 82. A pivot 84 is carried by the right hand end of ramp 80, and a pivot 86 is carried by the left hand end of ramp 82. A connecting link 88 is rotatably secured to the pivots 84 and 86; and it cooperates with ramps 80 and 82, pivots 84 and 86, and pivots 76 and 78 to form a double toggle arrangement. The operation and function of this double toggle arrangement is practically identical with the operation and function of the double toggle arrangement of Figs. 1–4. A trigger 90 is secured to the left hand ramp 80, as by passing that trigger through a slot in the right hand end of that ramp; and the trigger 90 can rotate relative to the ramp 80. The left hand end of trigger 90 is in the form of a treadle, and the right hand end of that trigger underlies and acts upon the connecting link 88. Rotation of trigger 90, in Fig. 7, will rotate the connecting link 88 and disable the toggle arrangement in the same way trigger 48 disabled the toggle arrangement of Figs. 1–4. A projecting portion 92 of ramp 82 overlies and bears against the connecting link 88. This projection performs the same function which the left hand end of ramp 40 performs. When the ramp construction of Figs. 7 and 8 is substituted for the ramp construction of Figs. 1–4, the trap will operate in the same manner.

Whereas two preferred embodiments of the present invention have been shown and described in the drawing and accompanying description, it should be obvious to those skilled in the art that various changes may be made in the form of the invention without affecting the scope thereof.

What I claim is:

1. An animal trap that comprises a housing of perforated material, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends positioned in confronting relation, a pivot carried by the confronting end of one of said ramps, a second pivot carried by the confronting end of said second ramp, a connecting link secured to and extending between said pivots, said connecting link, pivots, ramps, and pivot supports constituting a double toggle arrangement, said pivot carried by said second ramp being normally below a straight line between the pivot carried by said first ramp and the point of contact between said second pivot support and said second ramp but being movable to a position above said straight line, a portion of said second ramp overlying and bearing against said connecting link, and a trigger that is carried by said first ramp but is movable relative to said first ramp to cause movement of said pivot carried by said second ramp and thus disable said double toggle arrangement.

2. An animal trap that comprises a housing, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends positioned in confronting relation, a link between the confronting ends of said ramps, said link cooperating with said ramps to normally prevent movement of said ramps in response to forces applied to said first ramp, and a trigger that is carried by said first ramp but is movable relative to said first ramp and that is adapted to act upon said link and free the confronting ends of said ramps for downward movement.

3. An animal trap that comprises a housing, a pivot support within said housing, a second pivot support within said housing that is spaced from said first pivot support, a ramp pivoted to said first pivot support, a second ramp pivoted to said second pivot support, said ramps having their ends in confronting relation, a connecting link between said ramps, a portion of said second ramp being adjacent said connecting link and being adapted to act upon said connecting link, said connecting link and said portion of said second ramp normally preventing movement of said ramps when forces are applied to said first ramp but permitting movement of said ramps when forces are applied to said second ramp, and a trigger that is carried by said first ramp but is movable relative to said first ramp and that is adapted to act upon and shift said connecting link.

4. An animal trap that comprises a housing, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends in confronting relation, pivots carried by the confronting ends of said ramps, a connecting link extending between and secured to said pivots, a portion of said second ramp overlying said connecting link, and a trigger that is carried by said first ramp but is movable relative to that ramp, said pivots and connecting link normally being positioned so the pivot carried by said second ramp is below a straight line extending between the pivot carried by said first ramp and the point of contact between said second pivot support and said second ramp, said trigger being movable to raise the pivot carried by said second ramp to a position above said straight line.

5. An animal trap that comprises a housing, a pivot support within said housing, a second pivot support within said housing that is spaced from said first pivot support, a ramp pivoted to said first pivot support, a second ramp pivoted to said second pivot support, said ramps having their ends in confronting relation, pivots carried by the confronting ends of said ramps, a connecting link secured to and extending between said pivots, a portion of said second ramp being adapted to act upon said connecting link, and a trigger that is carried by said first ramp but is movable relative to that ramp, the pivot carried by said second ramp normally being below a straight line between the pivot carried by said first ramp and the point of contact between said second pivot support and said second ramp, the said portion of said second ramp normally engaging said connecting link, said trigger being movable to raise the pivot carried by said second ramp to a position above said straight line and to move said portion of said second ramp out of contact with said connecting link, said pivots of said ramps being thereupon movable downwardly through said straight line until the pivot carried by said second ramp is below a second straight line between the pivot carried by said first ramp and the point of contact between said second pivot support and said second ramp and until said portion of said second ramp contacts said connecting link.

6. An animal trap that comprises a housing, a ramp pivotally mounted within said housing, a second ramp pivotally mounted within said housing, a linkage extending between the confronting ends of said ramps to cause said confronting ends to move up or down simultaneously, and an opening in said housing adjacent said first ramp, said first ramp normally leaving said opening unobstructed but being movable to obstruct said opening, said second ramp being movable by the weight of an animal to move said first ramp and clear said opening.

7. An animal trap that comprises a housing, a ramp pivotally mounted within said housing, a second ramp pivotally mounted within said housing, a linkage extending between the confronting ends of said ramps to cause said confronting ends to move up or down simultaneously, an inlet opening in said housing adjacent said first ramp, said first ramp normally leaving said opening unobstructed but being movable to obstruct said opening, said second ramp being movable by the weight of an animal to move said first ramp and clear said inlet opening, and an exit door adjacent said second ramp.

8. An animal trap that comprises a housing, an opening in said housing, a ramp pivotally mounted within said housing for movement to one of two positions, a second ramp pivotally mounted within said housing for movement to one of two positions, a link that engages both of said ramps in both of said positions and normally holds said ramps against movement, and a trigger to act upon said link and permit movement of said ramps.

9. An animal trap that comprises a housing, an opening in said housing, a ramp pivotally mounted within said housing for movement to one of two positions, a second ramp pivotally mounted within said housing for movement to one of two positions, a link between the confronting ends of said ramps in both of said positions, said link normally resisting rotation of said first ramp but being movable to permit movement of said first ramp.

10. An animal trap that comprises a housing of perforated material, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends positioned in confronting relation, a pivot carried by the confronting end of one of said ramps, a second pivot carried by the confronting end of said second ramp, a connecting link secured to and extending between said pivots, said connecting link, pivots, ramps, and pivot supports constituting a double toggle arrangement, said pivot carried by said second ramp being normally below a straight line between the pivot carried by said first ramp and the point of contact between said second pivot support and said second ramp but being movable to a position above said straight line, a portion of said second ramp overlying and bearing against said connecting link, and a trigger that is movable to cause movement of said pivot carried by said second ramp and thus disable said double toggle arrangement, a one-way door in said outlet opening, and a collecting cage adjacent said outlet opening.

11. An animal trap that comprises a housing of perforated material, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends positioned in confronting relation, a pivot carried by the confronting end of one of said ramps, a second pivot carried by the confronting end of said second ramp, a connecting link secured to and extending between said pivots, said connecting link, pivots, ramps, and pivot supports constituting a double toggle arrangement, said pivot carried by said second ramp being normally below a straight line between the pivot carried by said first ramp and the point of contact between said second pivot support and said second ramp but being movable to a position above said straight line, a portion of said second ramp overlying and bearing against said connecting link, and a trigger that is movable to cause movement of said pivot carried by said second ramp and thus disable said double toggle arrangement, said ramps being movable to an initial or a tripped position, said toggle arrangement locking said first ramp against movement in both of said positions and locking said second ramp against movement in said initial position.

12. An animal trap that comprises a housing, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends in confronting relation, pivots carried by the confronting ends of said ramps, a connecting link extending between and secured to said pivots, a portion of said second ramp overlying said connecting link, and a trigger that is carried by said first ramp but is movable relative to that ramp, said pivots and connecting link normally being positioned so the pivot carried by said second ramp is below a straight line extending between the pivot carried by said first ramp and the point of contact between said second pivot support and said second ramp, said trigger being movable to raise the pivot carried by said second ramp to a position above said straight line, thereby disabling the toggle arrangement formed by said connecting link, pivots, ramps, and pivot supports so that said ramps can rotate relative to said pivot supports.

13. An animal trap that comprises a housing, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends positioned in confronting relation, a link between the confronting ends of said ramps, said link cooperating with said ramps to normally prevent movement of said ramps in response to forces applied to said first ramp, and a trigger that is carried by said first ramp but is movable relative to said first ramp and that is adapted to act upon said link and free said ramps for movement, said first ramp normally clearing said inlet opening but being movable to obstruct said opening, said second ramp normally clearing said outlet opening but being movable to obstruct said opening.

14. An animal trap that comprises a housing, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends positioned in confronting relation, a link between the confronting ends of said ramps, said link cooperating with said ramps to normally prevent movement of said ramps in response to forces applied to said first ramp, and a trigger that is carried by said first ramp but is movable relative to said first ramp and that is adapted to act upon said link and free said ramps for movement, such movement enabling said first ramp to obstruct said inlet opening, said connecting link also being movable by movement of said second ramp.

15. An animal trap that comprises a housing, an inlet opening in said housing, an outlet opening in said housing, a pivot support within said housing, a second pivot support within said housing that is spaced from said first pivot support, a ramp that is adjacent said inlet opening and is pivoted to said first pivot support, a second ramp that is adjacent said outlet opening and is pivoted to said second pivot support, said ramps having their ends positioned in confronting relation, a link between the confronting ends of said ramps, said link cooperating with said ramps to normally prevent movement of said ramps in response to forces applied to said first ramp, and a trigger that is carried by said first ramp but is movable relative to said first ramp and that is adapted to act upon said link and free said ramps for movement, said first ramp normally clearing said inlet opening but being movable to obstruct said opening, said second ramp normally clearing said outlet opening but being movable to obstruct said opening, whereby movement of said ramps obstructs said inlet and outlet openings and prevents escape of an animal within the trap and forces said animal to re-set said ramps before it can gain said outlet opening.

16. An animal trap that comprises a housing, a pivot support within said housing, a second pivot support within said housing that is spaced from said first pivot support, a ramp pivoted to said first pivot support, a second ramp pivoted to said second pivot support, said ramps having their ends in confronting relation, a connecting link between said ramps, a portion of said second ramp being adjacent said connecting link and being adapted to act upon said connecting link, said connecting link and said portion of said ramp normally preventing movement of said ramps when forces are applied to said first ramp but permitting movement of said ramps when forces are applied to said second ramp, and a trigger that is carried by said first ramp but is movable relative to said first ramp and that is adapted to act upon and shift said connecting link to a position relative to said ramps that permits movement of said ramps when forces are applied to said first ramp.

17. An animal trap that comprises a housing, an inlet opening in said housing, a ramp that is pivotally mounted within said housing and is adjacent said opening, said ramp normally clearing said opening but being movable to obstruct said opening, a trigger that is carried by said ramp but is movable relative to said ramp and that is operable by an animal to permit movement of said ramp to obstruct said opening, and a movable element that responds to the weight of said animal to restore said ramp to its initial position and clear said opening, and a toggle that normally prevents movement of said ramp due to the weight of said animal on said ramp but permits the weight of said animal on said member to return said ramp to said initial position.

18. An animal trap that comprises a housing, a ramp pivotally mounted within said housing, said ramp having a non-metallic surface on which the animal can walk, a second ramp within said housing, said second ramp having a metal surface on which the animal can walk, and a toggle connecting said ramps.

FRANK B. HEIBEL.

REFERENCES CITED

The following references are of record in the file of this patent:

UNITED STATES PATENTS

| Number | Name | Date |
|---|---|---|
| 801,537 | Massie | Oct. 10, 1905 |
| 1,054,564 | Kline | Feb. 25, 1913 |
| 1,066,004 | Ellison | July 1, 1913 |
| 1,077,098 | Sebesta | Oct. 28, 1913 |
| 1,471,047 | Melero | Oct. 16, 1923 |
| 1,601,848 | Carmack | Oct. 5, 1926 |